United States Patent [19]
Harrison

[11] Patent Number: 5,553,459
[45] Date of Patent: Sep. 10, 1996

[54] WATER RECOVERY DEVICE FOR RECLAIMING AND REFILTERING ATMOSPHERIC WATER

[75] Inventor: Larry G. Harrison, Garland, Tex.

[73] Assignee: The Watermarker Corp., Garland, Tex.

[21] Appl. No.: 280,290

[22] Filed: Jul. 26, 1994

[51] Int. Cl.$^6$ .................................................. F25D 17/06
[52] U.S. Cl. .................................................. 62/93; 62/271
[58] Field of Search ............................ 62/93, 285, 271, 62/272; 210/143, 137

[56] References Cited

U.S. PATENT DOCUMENTS

| | | |
|---|---|---|
| 1,931,347 | 10/1933 | Gay . |
| 2,409,624 | 10/1946 | Granville . |
| 2,682,758 | 7/1954 | Harris . |
| 2,779,173 | 1/1957 | Wurtz . |
| 3,035,418 | 5/1962 | Wright . |
| 3,496,731 | 2/1970 | Sholtes . |
| 3,675,442 | 7/1972 | Swanson .................. 62/285 |
| 3,861,165 | 1/1975 | Hirano ........................ 62/93 |
| 4,146,372 | 3/1979 | Groth et al. . |
| 4,182,132 | 1/1980 | Nasser et al. ................ 62/93 |
| 4,252,003 | 2/1981 | Eckard et al. . |
| 4,255,937 | 3/1981 | Ehrlich . |
| 4,319,461 | 3/1982 | Shaw . |
| 4,351,651 | 9/1982 | Courneya . |
| 4,505,128 | 3/1985 | Miller et al. . |
| 4,735,054 | 4/1988 | Beckey . |
| 4,841,740 | 6/1989 | Assaf ........................ 62/271 |
| 5,074,119 | 12/1991 | Anderson . |
| 5,106,512 | 4/1992 | Reidy . |
| 5,181,393 | 1/1993 | Lott . |
| 5,203,989 | 4/1993 | Reidy ...................... 210/137 |
| 5,227,053 | 7/1993 | Brym ....................... 210/143 |
| 5,259,203 | 11/1993 | Engel et al. . |

*Primary Examiner*—William Doerrler
*Attorney, Agent, or Firm*—Gregory M. Howison

[57] ABSTRACT

The present invention comprises an apparatus for obtaining potable water from the ambient air. A compressor (16) is provided for compressing a refrigerant. A condenser (18) is provided for condensing the refrigerant received from the compressor (16). An evaporator coil (14) is provided for receiving at one end thereof compressed refrigerant from the condenser (18) and being disposed in a water tank (12). The evaporator (14) is operable for evaporating refrigerant and thereby cooling the potable water (13) in the water tank (12). Drip coils (28) are provided for condensing the potable water from the ambient air with the cooled potable water (13) from the water tank passing through the drip coils (28) before returning to the water tank (12). A fan (20) is provided for blowing ambient air about the drip coils (28) and the condenser (18). A discharge device (44) is provided and is connected to the drip coil (28) and a pump (27) is provided for pumping water through the drip coils (28) and the discharge device (44). A filter (40) and ultra-violet light source (42) are provided for sterilizing the potable water (13) and a non-toxic coating is provided and disposed on the interior of the drip coil (28) and the exterior of the evaporator (14), with the non-toxic coating comprising 25 to 35 percent titanium oxide.

14 Claims, 2 Drawing Sheets

५,५५३,४५९

WATER RECOVERY DEVICE FOR RECLAIMING AND REFILTERING ATMOSPHERIC WATER

TECHNICAL FIELD OF THE INVENTION

The present invention pertains in general to a water making apparatus, and more particularly, to a water making apparatus which makes potable water from the moisture in atmospheric air.

BACKGROUND OF THE INVENTION

There are large areas of the world in which fresh water is in critical demand. Many different methods are being utilized to recover fresh water from salt or brackish water. These methods necessarily produce a salt brine or a solid residue of salts which may provide a waste disposal problem.

In the past, water vapor has been removed from humid air primarily for the purpose of lowering humidity. This humidity lowering has been accomplished chemically and mechanically. When done chemically, using chemicals to absorb water from the atmosphere, the water is then not readily available for further usage as potable water. In the usual mechanical de-humidifying processes, as conducted in commercial de-humidifier units, the atmosphere is passed over cooling coils through which a refrigerant is passed.

In recent years, it is becoming more usual for people in both offices and homes to drink bottled water rather than water from the tap. Countless other situations exist where water is difficult to obtain or where available water or water quality leaves much to be desired. In many cases, this also creates a need to carry and lift heavy bottles of water periodically and to carry the water from the place where it was purchased to the place where it will be used.

SUMMARY OF THE INVENTION

The present invention disclosed and claimed herein comprises an apparatus for obtaining potable water from the ambient air. A compressor is provided for compressing a refrigerant. A condenser is provided for condensing the refrigerant received from the compressor. An evaporator coil is provided for receiving at one end thereof compressed refrigerant from the condenser and being disposed in a water tank. The evaporator is operable for evaporating refrigerant and thereby cooling the potable water in the water tank. Drip coils are provided for condensing the potable water from the ambient air with the cooled potable water from the water tank passing through the drip coils before returning to the water tank. A fan is provided for blowing ambient air about the drip coils and the condenser. A discharge device is provided and is connected to the drip coil and a pump is provided for pumping water through the drip coils and the discharge device. A filter and ultra-violet light source are provided for sterilizing the potable water and a non-toxic coating is provided and disposed on the exterior of the drip coil and the exterior of the evaporator, with the non-toxic coating comprising 25 to 35 percent titanium oxide, which coating is operable to isolate the surface of the coils from the drinking water, such that toxic materials cannot be leached from the coils to the water.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
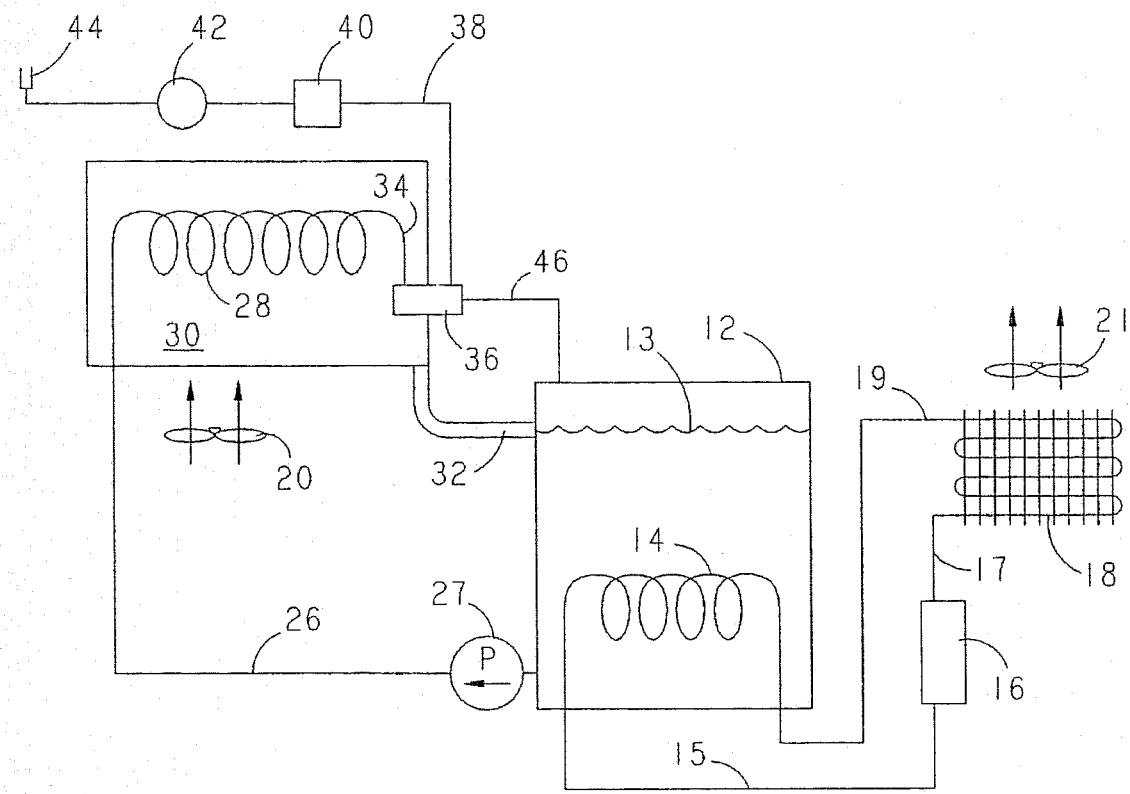
FIG. 1 illustrates a mechanical schematic of the system of the present invention.

Referring now to FIG. 1, there is illustrated a mechanical schematic of the system of the present invention. A water tank 12 is provided having disposed in it a quantity of potable water 13. The water tank 12 may be formed of any waterproof material and may be insulated from temperature changes. Disposed inside the water tank 12 at or near the bottom of the water tank 12 is an evaporator coil 14 having an input and an outlet. A compressor 16 is provided having an input and an outlet and is disposed proximate to but outside of the water tank 12. The outlet of the evaporator coil 14 is connected by a conduit 15 to the input of the compressor 16. Two fans 20 and 21 are provided. A condenser coil 18 is provided having an input and an outlet and is located outside of the water tank 12. The condenser coil 18 is located such that the fan 21 draws air about the condenser coil 18. The input of the condenser coil 18 is connected to the outlet of the compressor 16 by a conduit 17. The outlet of the condenser 18 is connected to the input of the evaporator coil 14 by a conduit 19.

In operation, a refrigerant is cycled through the conduits 15, 17 and 19 and the evaporator coil 14 and the condenser coil 18 by the compressor 16. As the refrigerant is compressed to near a state of adiabatic compression by the compressor 16, its temperature rises due to the work (energy) added to the refrigerant by the compressor 16. The heated and pressurized refrigerant vapor is then contained and distributed to the condenser coil 18 by conduit 17. The heated and pressurized refrigerant vapor enters the condenser coil 18. The condenser coil 18 is positioned in the air flow created by the fan 21. As the heat is drawn away from the refrigerant vapor by the condenser coil 18 and expelled into the atmosphere by the air flow created by fan 21, the temperature of the refrigerant vapor is lowered and the refrigerant vapor is condensed into a high pressure liquid. The high pressure liquid is then distributed through the conduit 19 through the walls of a water tank 12 into the input of the evaporator coil 14.

The high pressure liquid then moves into the evaporator coil 14 which is at a state of vacuum or low pressure caused by the compressor 16. This causes the contained high pressure liquid to boil or evaporate, thereby absorbing heat from the water 13 contained inside the water tank 12. The high pressure liquid refrigerant is then transformed into a low pressure refrigerant liquid and further into a low pressure refrigerant vapor. The low pressure vapor is then drawn through the outlet of evaporator coil 14 through conduit 15 and through the walls of the water tank 12 and into the compressor 16 where it is once again compressed by the compressor 16.

Referring further to FIG. 1, a pump 27 having an output is provided and is located inside the water tank 12 and positioned near the base of the water tank 12. A cold water intake conduit 26 is provided and is connected to the output of pump 27. The pump 27 is operable to draw water from water tank 12 which has been cooled by the evaporator coil 14 and pump it through the cold water intake conduit 26. A drip coil 28 is provided and is placed above the top of the water tank 12 in the air flow created by fan 20. The drip coil 28 has an intake end and an efferent end 34. The intake end of drip coil 28 is connected to the cold water intake conduit 26.

A collection pan 30 is disposed directly beneath the drip coil 28. A collected water conduit 32 is provided and is operable to connect the collection pan 30 with water tank 12. The base of the collection pan 30 is disposed such that it is at a higher level than the water tank 12 thereby allowing water flow from collection pan 30 through the collected water conduit 32 and into the water tank 12 using only the force of gravity. A faucet solenoid 36 is provided. The faucet solenoid 36 has one input and two outputs and is operable to switch the input between the two outputs. The input of the faucet solenoid 36 is connected to the efferent end 34 of the drip coil 28. A faucet conduit 38 is provided and is connected to one output of the faucet solenoid 36. A filter 40 and an ultraviolet light source 42 are provided and disposed along faucet conduit 38. A faucet 44 is also provided and is connected to the opposite end of the faucet conduit 38 as the faucet solenoid 36 is connected. A cold water return conduit 46 is provided. One end of the cold water return conduit 46 is connected to the second output of the faucet solenoid 36. The other end of the cold water return conduit 46 is connected to the water tank 12.

In operation, water 13 in the water tank 12, which has been cooled by the evaporator coil 14, is drawn by the pump 27 out of the water tank 12 and pumped through the cold water intake conduit 26. The cool water 13 is then pumped through the drip coil 28. As this occurs, the fan 20 draws atmospheric air across the drip coil 28 which has been cooled by the water 13. This causes water to condensate on the drip coil 28 and fall into the collection pan 30. The water then flows through the collected water conduit 32 and into the water tank 12. The cool water 13 that is being pumped through the drip coil 28 is then pumped through the efferent end 34 of drip coil 28 to the faucet solenoid 36. The usual position of the faucet solenoid 36 is to allow the cool water 13 to pass through the faucet solenoid 36 to the cold water return conduit 46 where the cool water 13 is returned to water tank 12.

When water is desired to be output through the faucet 44, the faucet solenoid 36 is switched on such that the cool water 13 is diverted from the efferent end 34 of the drip coil 28 through the faucet conduit 38. The water then passes through a filter 40 and an ultraviolet light source 42 before being output by the faucet 44. When the faucet solenoid 36 is switched off, the faucet solenoid 36 again allows the cool water 13 to flow from the efferent end 34 of the drip coil 28 through the faucet solenoid 36 to the cold water return conduit 46 where the cool water 13 is returned to water tank 12.

Figure 2:
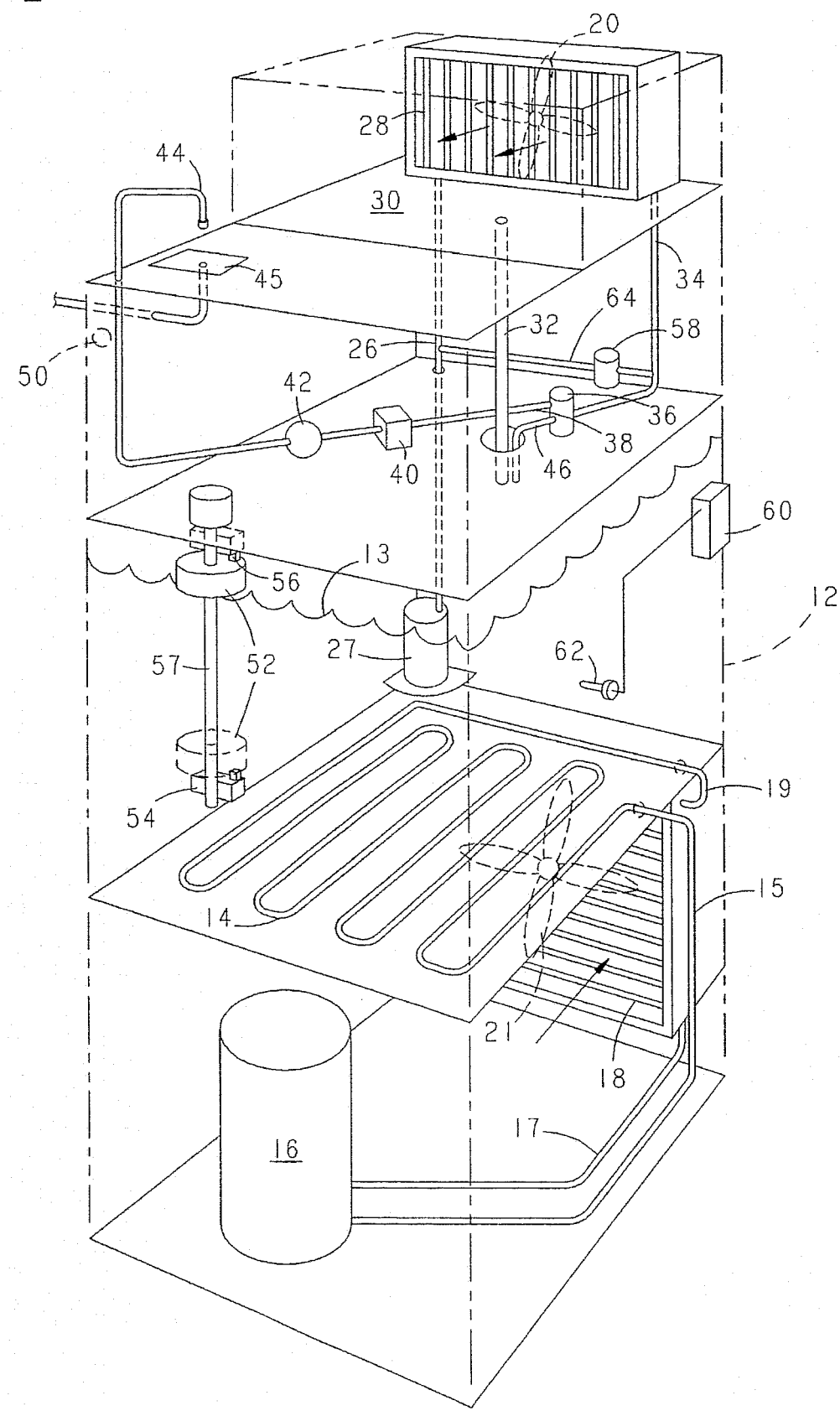
FIG. 2 illustrates an exploded diagram of the system of the present invention.

Referring now to FIG. 2, there is illustrated an exploded detailed diagram of the system of the present invention. The water tank 12 is shown containing water 13. The evaporator coil 14 is shown disposed inside the water tank 12 at or near the bottom of the water tank 12. The conduit 15 is shown running from the outlet of the evaporator coil 14 through the wall of the water tank 12 to the input of the compressor 16. Conduit 17 is shown running from the outlet of the compressor 16 to the input of the condenser coil 18. Conduit 19 is shown running from the outlet of the condenser coil 18 through the wall of the water tank 12 to the input of the evaporator coil 14.

The pump 27 having an output is shown located inside the water tank 12 and positioned near the bottom of the water tank 12. The cold water intake conduit 26 is shown having one end connected to the outlet of the pump 27. The other end of the water intake conduit 26 is connected to the input of the drip coil 28. The drip coil 28 is positioned above the top of the water tank 12 in the air flow created by fan 20. The faucet solenoid 36 is shown having one input and two outputs. The drip coil 28 is shown having an efferent end 34 leading to the input of the faucet solenoid 36. One output of the faucet solenoid 36 is connected to the cold water return conduit 46 which leads back into the water tank 12. Connected to the other output of the faucet solenoid 36 is the faucet conduit 38 which leads through the UV light source 42 and the filter 40 to the faucet 44. A button 50 is provided which activates the faucet solenoid 36 and is connected thereto. The collection pan 30 is shown located directly beneath the drip coil 28. The collected water conduit 32 is shown connecting the collection pan 30 with the water tank 12.

A float 52 is provided inside the water tank 12 and is operable to move along a rod 57 between a low position sensor 54 and a high position sensor 56. A tank full solenoid 58 is provided and is located along a conduit 64 connecting the cold water intake conduit 26 with the efferent end 34 of the drip coil 28. The tank full solenoid is operable to allow or not allow water to flow along conduit 64. The high position sensor 56 is connected to and operates a tank full solenoid 58. The low position sensor 54 is connected to the faucet solenoid 36. The low position sensor 54 is operable to disable the faucet solenoid 36 from turning on. A thermostat 60 is provided having a sensor 62 disposed near the bottom of the water tank 12. A thermostat is connected to and controls the compressor 16. A faucet drain 45 is also provided.

In operation, water tank 12 holds fresh water 13. When the thermostat 60 determines through its sensor 62 that the water 13 contained in water tank 12 needs to be cooled, the compressor 16 is activated. The compressor compresses a refrigerant vapor to near a state of adiabatic compression, thereby causing its temperature to rise due to the work (energy) added to the refrigerant vapor by the compressor 16. The heated and pressurized refrigerant vapor is then contained and distributed to the condenser coil 18 by conduit 17. The heated and pressurized refrigerant vapor then enters the condenser coil 18. The fan 21 causes air to flow past the condenser coil 18 drawing heat away from the refrigerant vapor and the condenser coil 18 and expelling the heat into the atmosphere, thus reducing the temperature of the refrigerant and causing it to condense a high pressure refrigerant liquid. The high pressure liquid is then distributed through the conduit 19 through the walls of the water tank 12 to the input of the evaporator coil 14.

The high pressure refrigerant liquid then moves into the evaporator coil 14 which is at a state of vacuum or low pressure caused by the compressor 16. This causes the contained high pressure refrigerant liquid to boil or evaporate, thereby absorbing heat from the water 13 contained inside the water tank 12. The high pressure liquid refrigerant is then transformed into a low pressure refrigerant liquid and further into a low pressure refrigerant vapor. The low pressure refrigerant vapor is then drawn through the outlet of the evaporator coil 14 through the conduit 15 and through the walls of the water tank 12 and into the compressor where is once again compressed by the compressor 16. Once the water 13 contained in the water tank 12 is cooled to a temperature sufficiently cooler than its dew point, as sensed by sensor 62, thermostat 60 turns off compressor 16 until it is determined that the water 13 inside water tank 12 needs to be cooled again.

On start-up, a sufficient amount of water 13 is poured inside water tank 12 to cover the pump 27, the pump 27 begins to pump the cooled water 13 through the cold water intake conduit 26. The water is then pumped through drip coil 28. Drip coil 28 is positioned in a flow of air caused by fan 20. As the atmospheric air passes by the cooled drip coil 28, water from the atmosphere condensates and drips into collection pan 30. The water then flows from the collection pan 30 through the collected water conduit 32 and into water tank 12. Using the cool water 13 from the water tank 12 allows water to be recovered from the atmosphere using only one conventional refrigeration system.

After the cooled water passes through drip coil 28, it passes through the efferent end 34 of drip coil 28 to faucet solenoid 36. The usual off position of faucet solenoid 36 is to allow the cool water 13 to pass through faucet solenoid 36 to the cold water return conduit 46 and back into the water tank 12. When float 52 raises above the low position sensor 54, faucet button 50 is energized. The faucet solenoid 36 may then be activated by button 50. When this occurs, the faucet solenoid 36 diverts the water from the efferent end 34 of drip coil 28 through the faucet conduit 38 which causes the water to flow through the ultraviolet light source 42 and the filter 40 and be expelled through faucet 44. This allows cool water 13 to be expelled using the pressure from the one pump 27. When button 50 is released, faucet solenoid 36 then allows the water 13 to once again flow through the cold water return conduit 36 back into water tank 12. This continues to occur until float 52 moves along rod 57 and reaches the high position sensor 56. When this occurs, the tank full solenoid 58 is opened so that the water being pumped from the water tank 12 through pump 27 and through cold water intake conduit 26 flows along a bypass conduit 64 from the cold water intake conduit 26 to the efferent end 34 of drip coil 28. This causes the cold water 13 to bypass the drip coil 28 so that no more water is condensed into collection pan 30 causing no water to flow into water tank 12. Once enough water 13 is removed from water tank 12 through faucet 44 so that the float 52 disengages from the high position sensor 56, the tank full solenoid is closed such that the cool water 13 begins once again to flow through drip coil 28 and water from the atmosphere begins one again to condense on the drip coil 28.

The outside of the evaporator coil 14 which is disposed inside of water tank 12 and the outer surface of drip coil 28 are coated with a non-toxic material such that most toxins in the metals comprising the drip coil 28 or the evaporator coil 14 are not exposed to the water 13 and therefore will not leach into the water 13. Even though it is also desirable to also coat the inside of drip coil 28, this is not imperative since the inside of drip coil 28 is always filled with water and this keeps out oxygen, keeping leaching to a minimum. The coating is an epoxy hybrid powder coating which contains 25 to 35 percent by weight titanium oxide, product number MetalMate 5MM0004 "Pepsico White" sold by Jones Blair Company of Dallas, Tex. The raw materials used in making this coating are listed in the Federal Register under the U.S. Code of Federal Regulations (21 C.F.R.), also known as Title 21 of the Food and Drug Administration. They are listed under paragraph 175 for "resinous and polymeric coatings" which may be safely used as food contact surfaces and paragraph 177 for "indirect food additives."

Figure 3:
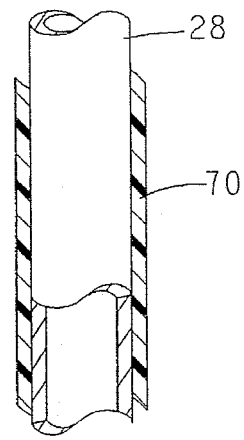
FIG. 3 illustrates a cross-section of the coil with a non-toxic exterior coating applied to the exterior surface of the coil.

FIG. 3 illustrates a cross-section of the coil 28 with an interior coating 70 of the epoxy hybrid powder. The coil 28 is fabricated of aluminum or copper at a thickness of approximately 0.030 inches with the coatings 70 being applied to a thickness of approximately 3 mil inches.

In summary, there has been provided an apparatus for obtaining potable water from the ambient air. An evaporator coil is provided for receiving at one end thereof compressed refrigerant from the condenser and being disposed in a water tank. The evaporator is operable for evaporating refrigerant and thereby cooling the potable water in the water tank. Drip coils are provided for condensing the potable water from the ambient air with the cooled potable water from the water tank passing through the drip coils before returning to the water tank. Two fans are provided for blowing ambient air about the drip coils and the condenser. A discharge device is provided and is connected to the drip coil and a pump is provided for pumping water through the drip coils and the discharge device. A filter and ultra-violet light source are provided for sterilizing the potable water and a non-toxic coating is provided and disposed on the exterior of the drip coil and the exterior of the evaporator, with the non-toxic coating comprising 25 to 35 percent titanium oxide.

Although the preferred embodiment has been described in detail, it should be understood that various changes, substitutions and alterations can be made therein without departing from the spirit and scope of the invention as defined by the appended claims.

What is claimed is:

1. An apparatus for obtaining potable water from the ambient air, comprising:

a water tank for holding the potable water;

a compressor for compressing a refrigerant;

a condenser for condensing said refrigerant received from said compressor;

an evaporator coil disposed in said water tank, receiving on one end thereof compressed refrigerant from said condenser, said evaporator coil for evaporating said refrigerant and thereby cooling the potable water in said water tank, the other end of said condenser connected to said compressor to input the uncompressed refrigerant thereto;

drip coils having an intake end and an efferent end for condensing the potable water from the ambient air, the cooled potable water from said water tank passing through said drip coils before returning to said water tank;

a fan for blowing the ambient air about said drip coils and said condenser;

a collection device for collecting condensed water from said drip coils and directing it to said water tank;

a discharge device connected to said efferent end of said drip coils for discharging the cooled potable water after passing through said drip coils;

a pump for pumping the cooled potable water through said drip coils and said discharge device;

a filter and an ultra-violet light source disposed between said drip coils and said discharge device for sterilizing the cooled potable water prior to discharge and after passing through said drip coils; and a non-toxic insulating coating disposed on the exterior of said drip coils and the exterior of said evaporator coil, such that the toxic metals which may be contained in said drip coils or said evaporator coil will be contained and not dispersed into the potable water, said non-toxic coating comprising 25 to 35 percent titanium oxide.

2. The apparatus of claim 1 wherein said ultra-violet light source and said filter are disposed near said discharge device such that the cooled potable water is filtered and passes through said ultra-violet light source immediately prior to being discharged by said discharge device.

3. The apparatus of claim 1 and further comprising a thermostat to control the operation of said compressor, turning said compressor on when the potable water needs to be cooled, and turning said compressor off when the potable water reaches a certain temperature.

4. The apparatus of claim 1 and further comprising a discharge solenoid disposed at the efferent end of said drip coils for diverting the cooled potable water from said efferent end of said drip coils to said discharge device when said discharge solenoid is enabled.

5. The apparatus of claim 1 and further comprising a tank full solenoid disposed along a conduit connecting the input end and the efferent end of said drip coils for causing the cooled potable water to bypass said drip coils when said tank full solenoid is enabled such that no additional potable water is condensed from the ambient air.

6. The apparatus of claim 1 and further comprising:

a discharge solenoid disposed at the efferent end of said drip coils for diverting the cooled potable water from said efferent end of said drip coils to said discharge device when said discharge solenoid is enabled;

a tank full solenoid disposed along a conduit connecting the input end and the efferent end of said drip coils for causing the cooled potable water to bypass said drip coils when said tank full solenoid is enabled such that no addtional potable water is condensed from the ambient air; and a float connected to a low water level sensor to indicate a low water level and a high water level sensor to indicate a high water level of said potable water in said water tank, said low water level sensor disabling a discharge solenoid when activated and said high water level sensor enabling a tank full solenoid when activated.

7. The apparatus of claim 1 and further comprising a non-toxic coating disposed on the interior of said drip coils, such that the toxic metals which may be contained in said drip coils will be contained and not dispersed into the potable water, said non-toxic coating comprising 25 to 35 percent titanium oxide.

8. A method for obtaining potable water from the ambient air, comprising the steps of:

placing a small amount of potable water in a water tank;

compressing a refrigerant using a compressor;

condensing the refrigerant received from the compressor and routing it to an evaporator coil;

placing the evaporator coil in the bottom of the water tank;

receiving on one end of the evaporator coil compressed refrigerant from the condenser, the other end of the condenser connected to the compressor to input the compressed refrigerant thereto;

evaporating the refrigerant in the evaporator coil and thereby cooling the potable water in the water tank;

pumping the potable water from the water tank through drip coils and then returning the potable water to the water tank;

blowing the ambient air about the drip coils and the condenser using a fan to condense the potable water from the ambient air;

selectively pumping the potable water through a discharge device by selectively diverting the potable water flowing through the drip coils from being returned to the water tank to instead flow to an external discharge location;

sterilizing and filtering the potable water using a filter and a UV light source disposed between the drip coils and the discharge device when the potable water is being routed to the discharge location; and coating the exterior of the drip coils and the exterior of the evaporator coil with a non-toxic insulating coating such that the toxic metals which may be contained in the drip coils or the evaporator coil may be contained and not dispersed into the potable water, the non-toxic coating comprising 25 to 35 percent titanium oxide.

9. The method of claim 8 wherein the ultra-violet light source and the filter are disposed near the discharge device such that the potable water is filtered and passes by the ultra-violet light source immediately prior to being discharged by the discharge device.

10. The method of claim 8 and further comprising the step of controlling the operation of the compressor using a thermostat, turning the compressor on when the potable water needs to be cooled, and turning the compressor off when the potable water reaches a certain temperature.

11. The method of claim 8 and further comprising the step of diverting the potable water from the efferent end of the drip coils to the discharge device using a discharge solenoid disposed at the efferent end of the drip coils.

12. The method of claim 8 and further comprising the step of bypassing the drip coils using a tank full solenoid disposed along a conduit connecting the input end and the efferent end of the drip coils so that no more potable water is condensed when the water tank is full.

13. The method of claim 8 and further comprising the steps of:

a discharge solenoid disposed at the efferent end of said drip coils for diverting the cooled potable water from said efferent end of said drip coils to said discharge device when said discharge solenoid is enabled;

a tank full solenoid disposed along a conduit connecting the input end and the efferent end of said drip coils for causing the cooled potable water to bypass said drip coils when said tank full solenoid is enabled such that no additional potable water is condensed from the ambient air; and sensing a low water level and a high water level of the potable water in the water tank using a float connected to two sensors, disabling a discharge solenoid when the low water level is sensed and activating a tank full solenoid when the high water level is sensed.

14. The method of claim 8 and further comprising the step of coating the interior of the drip coil with a non-toxic insulating coating such that the toxic metals which may be contained in the drip coils may be contained and not dispersed into the water, the non-toxic coating comprising 25 to 35 percent titanium oxide.

* * * * *

UNITED STATES PATENT AND TRADEMARK OFFICE
CERTIFICATE OF CORRECTION

PATENT NO. : 5,553,459
DATED : September 10, 1996
INVENTOR(S) : Larry G. Harrison It is certified that error appears in the above-indentified patent and that said Letters Patent is hereby corrected as shown below:

Column 6, Claim 1, line 48, insert --the-- following "collecting".

Column 6, Claim 1, line 48, insert --potable-- following "condensed".

Signed and Sealed this

Twenty-first Day of January, 1997

Attest:

BRUCE LEHMAN

*Attesting Officer*     *Commissioner of Patents and Trademarks*